(12) United States Patent
Li

(10) Patent No.: US 12,191,455 B2
(45) Date of Patent: Jan. 7, 2025

(54) ELECTROCHEMICAL DEVICE AND ELECTRONIC DEVICE THAT APPLIES SAME

(71) Applicant: NINGDE AMPEREX TECHNOLOGY LIMITED, Ningde (CN)

(72) Inventor: Yong Li, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 73 days.

(21) Appl. No.: 17/695,434

(22) Filed: Mar. 15, 2022

(65) Prior Publication Data
US 2022/0320591 A1  Oct. 6, 2022

(30) Foreign Application Priority Data

Mar. 30, 2021  (CN) .......................... 202110339135.0

(51) Int. Cl.
*H01M 4/66* (2006.01)
*H01M 4/62* (2006.01)
*H01M 10/0587* (2010.01)

(52) U.S. Cl.
CPC ....... *H01M 10/0587* (2013.01); *H01M 4/628* (2013.01); *H01M 4/664* (2013.01); *H01M 4/667* (2013.01); *H01M 4/668* (2013.01)

(58) Field of Classification Search
CPC .......... H01M 4/66; H01M 4/664; H01M 4/04; H01M 10/0587; H01M 10/0565
See application file for complete search history.

(56) References Cited

U.S. PATENT DOCUMENTS

| | | | | |
|---|---|---|---|---|
| 6,010,801 A | * | 1/2000 | Nakamaru | H01M 50/533 |
| | | | | 429/246 |
| 2011/0189518 A1 | * | 8/2011 | Fujita | H01M 10/0587 |
| | | | | 429/94 |

(Continued)

FOREIGN PATENT DOCUMENTS

| | | |
|---|---|---|
| CN | 205846132 U | 12/2016 |
| CN | 205985209 U | 2/2017 |

(Continued)

OTHER PUBLICATIONS

Machine Translation of: CN 205985209 U, Wang et al., Feb. 22, 2017.*

(Continued)

*Primary Examiner* — Kenneth J Douyette
(74) *Attorney, Agent, or Firm* — WHDA, LLP

(57) ABSTRACT

An electrochemical device includes an electrolytic solution, an electrode assembly, and a housing accommodating the electrolytic solution and the electrode assembly. The electrode assembly includes a first electrode plate, a second electrode plate, and a separator disposed there between, which are stacked and wound. In a direction of a winding central axis, the electrochemical device includes a first end and a second end that are opposite to each other. The first electrode plate includes a first current collector and a first active material layer disposed on the first current collector. The first current collector includes a first part. In the direction of the winding central axis, the first part is located at an end of the first current collector and is closer to the first end than the second end. A porous layer is disposed on the first part.

18 Claims, 10 Drawing Sheets

(56) References Cited

U.S. PATENT DOCUMENTS

2012/0088137 A1   4/2012  Nakura
2015/0072204 A1*  3/2015  Kwon ................ H01M 50/538
                                                                429/94

FOREIGN PATENT DOCUMENTS

| CN | 106531961 A   | 3/2017  |
| CN | 111668451 A   | 9/2020  |
| CN | 112018397 A   | 12/2020 |
| JP | 2011-014238 A | 1/2011  |
| JP | 2017-157529 A | 9/2017  |

OTHER PUBLICATIONS

Office Action dated Feb. 25, 2022, issued in counterpart CN application No. 202110339135.0. (8 pages).

* cited by examiner

ELECTROCHEMICAL DEVICE AND ELECTRONIC DEVICE THAT APPLIES SAME

CROSS REFERENCE TO RELATED APPLICATION

This application claims priority to Chinese Patent Application Ser. No. 202110339135.0, filed on Mar. 30, 2021, the content of which is incorporated herein by reference in its entirety.

TECHNICAL FIELD

This application relates to the technical field of batteries, and in particular, to an electrochemical device and an electronic device that applies same.

BACKGROUND

A cylindrical battery is a widely used battery structure. The cylindrical battery is generally in an all-tab structure, in which a widthwise side of a current collector is fully retained as a tab without being cut away. In this structure, positive and negative current collectors are tightly welded to current collection plates, thereby limiting infiltration by an electrolytic solution.

SUMMARY

To solve at least one problem in the prior art, this application provides an electrochemical device that can improve electrochemical cycle performance.

An embodiment of this application provides an electrochemical device. The electrochemical device includes an electrolytic solution, an electrode assembly, and a housing. The housing accommodates the electrolytic solution and the electrode assembly. The electrode assembly includes a first electrode plate, a second electrode plate, and a separator disposed between the first electrode plate and the second electrode plate. The first electrode plate, the separator, and the second electrode plate are stacked and wound. In a direction of a winding central axis, the electrochemical device includes a first end and a second end that are opposite to each other. The first electrode plate includes a first current collector and a first active material layer disposed on the first current collector. The first current collector includes a first part. In the direction of the winding central axis, the first part is located at an end of the first current collector and is closer to the first end than the second end. A porous layer is disposed on the first part.

The porous layer transfers the electrolytic solution effectively. Under the capillary action of the porous layer, free electrolytic solution in the electrochemical device can be easily transferred to the first active material layer through the porous layer, thereby increasing the content of the electrolytic solution in the first active material layer during electrical cycling, alleviating the problem of insufficient content of the electrolytic solution in a local region inside the electrochemical device, and increasing the cycle life.

In a possible implementation, the porous layer includes at least one of a polymer material or a ceramic material.

In a possible implementation, the polymer material includes at least one of polyvinylidene difluoride, polytetrafluoroethylene, polyurethane, polyethylene oxide, polypropylene oxide, polyacrylonitrile, polyacrylamide, polymethyl acrylate, polymethyl methacrylate, polyvinyl acetate, polyvinylpyrrolidone, polytetraethylene glycol diacrylate, polyimide, polyphenylene ester, polyarylether, or polypyrrole. The ceramic material includes at least one of boehmite, silicon dioxide, aluminum oxide, titanium oxide, magnesium oxide, magnesium hydroxide, zirconium oxide, mullite, or cordierite.

In a possible implementation, the first part includes a first bend portion located at the end of the first current collector, and the first bend portion is disposed toward the winding central axis.

In a possible implementation, the first bend portion located on an outer circle of the electrode assembly is connected to a surface of an adjacent first bend portion located in an inner circle of the electrode assembly, where the surface faces the first end. Further, at least a part of the first part is bent toward the winding central axis, thereby improving the flatness of the first end of the electrode assembly, increasing the area of electrical connection of the first electrode plate, and improving reliability of the electrical connection.

In a possible implementation, the electrochemical device further includes a first current collection plate. The porous layer is disposed on a surface of the first bend portion facing opposite from the first end, and a surface of the first bend portion facing the first end is connected to the current collection plate. The porous layer disposed on the surface of the first bend portion facing the winding center (and away from the first end) can accelerate the speed of diffusing the electrolytic solution from outside to inside of the electrode assembly, thereby improving the infiltration by the electrolytic solution.

In a possible implementation, the first current collector further includes a third part. In the direction of the winding central axis, the third part is located at an end of the first current collector and is closer to the second end than the first end. A porous layer is disposed on the third part.

In a possible implementation, in the winding direction, the porous layer includes a plurality of interspaced sub-layers.

In a possible implementation, a thickness of the porous layer is smaller than a thickness of the active material layer.

This application further provides an electronic device. The electronic device includes the electrochemical device described above.

In the electrochemical device disclosed herein in contrast with the prior art, the porous layer transfers the electrolytic solution effectively. Free electrolytic solution in the electrochemical device can be easily transferred to the first active material layer through the porous layer, thereby increasing the content of the electrolytic solution in the first active material during electrical cycling, alleviating the problem of insufficient content of the electrolytic solution in a local region inside the electrochemical device, and increasing the cycle life of the electrochemical device.

REFERENCE NUMERALS

Figure 1:
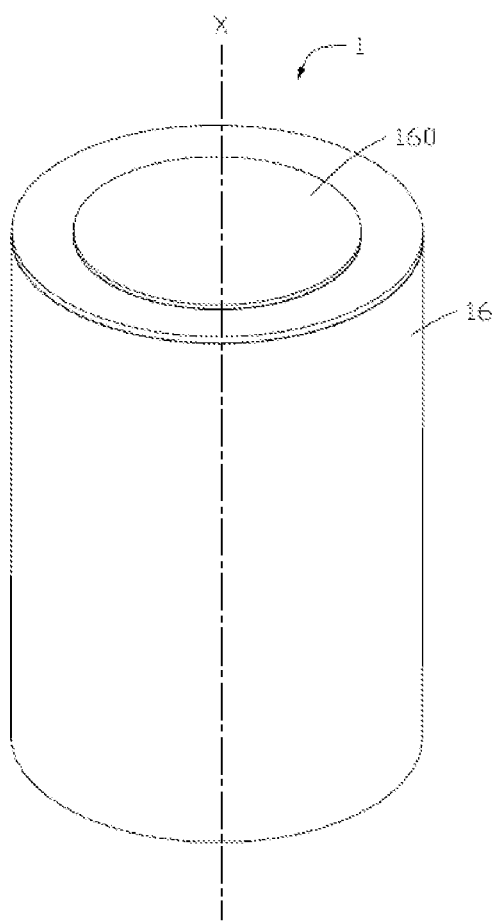
FIG. 1 is a three-dimensional schematic diagram of an electrochemical device according to an embodiment of this application.

Electrochemical device 1
First end 101
Second end 102
Electrode assembly 10
First electrode plate 11
First current collector 110
First surface 1101
Second surface 1102
First part 111
Second part 112
First active material layer region 113
First bend portion 114
Second electrode plate 12
Second current collector 120
Third surface 1201
Fourth surface 1202
Third part 121
Fourth part 122
Second active material layer region 123
Second bend portion 124
Separator 13
First active material layer 141
Second active material layer 142
Porous layer 15
Sub-layer 150
Groove 151

Housing 16
Conductive bulge 160
Conductive rod 169
Electrolytic solution 17
Current collection plate 18
First current collection plate 181
Second current collection plate 182
First thickness D1
Second thickness D2
Winding central axis X
First direction Y
Winding center Q
Electronic device 100
Load 105

This application is further described below with reference to the following specific embodiments and the foregoing drawings.

DETAILED DESCRIPTION

The following describes the content of this application more comprehensively with reference to drawings. The drawings show exemplary embodiments of this application. However, this application may be implemented in many different forms, and is in no way construed as being limited to the exemplary embodiments described herein. The exemplary embodiments are intended to describe this application thoroughly and comprehensively, and impart the scope of this application sufficiently to those skilled in the art. Identical or similar reference numerals represent identical or similar components.

The terms used herein are merely intended to describe specific exemplary embodiments but not to limit this application. Unless otherwise expressly specified in the context, a noun in the singular form preceded by "a", "an", "the" used herein is intended to include the plural form thereof. In addition, the terms "include", "comprise", and/or "contain" used herein specify the existence of the stated features, regions, integers, steps, operations, elements, and/or components, but do not exclude the existence or addition of one or more other features, regions, integers, steps, operations, elements, components, and/or any combinations thereof.

Unless otherwise defined, all terms (including technical and scientific terms) used herein have the same meanings as what is commonly understood by a person of ordinary skill in the art. In addition, unless otherwise expressly defined herein, the terms defined in a general-purpose dictionary are interpreted as having the same meanings as what is meant in the related technology and the context of this application, but are not interpreted as idealized or overly formal meanings.

The following describes exemplary embodiments with reference to drawings. It needs to be noted that the components described with reference to the drawings are not necessarily shown to scale. The same or similar components will be assigned the same or similar reference numerals to represent the same or similar technical terms.

The following describes specific embodiments of this application in more detail with reference to drawings.

Figure 2:
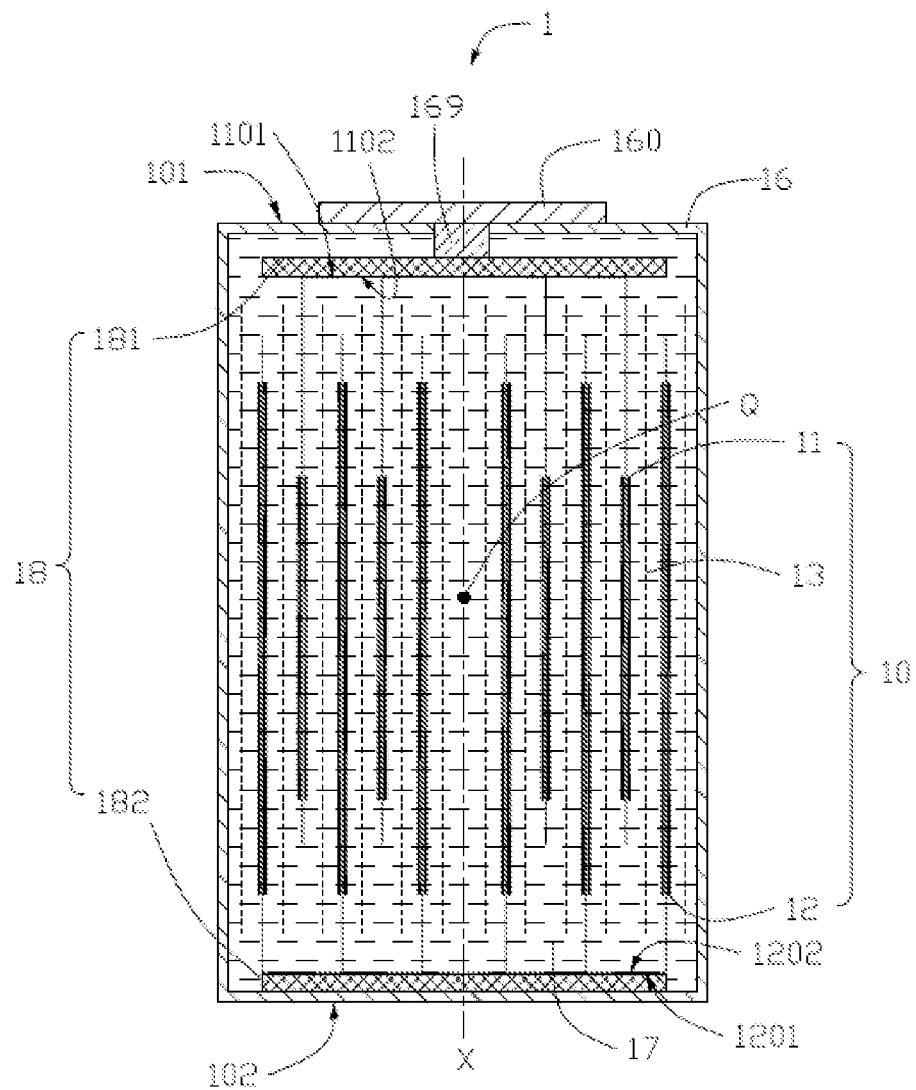
FIG. 2 is a schematic sectional view of an electrochemical device according to an embodiment of this application.

An embodiment of this application provides an electrochemical device 1. As shown in FIG. 1 and FIG. 2, the electrochemical device 1 includes an electrode assembly 10, a housing 16, an electrolytic solution 17, and a current collection plate 18. The housing 16 accommodates the electrode assembly 10, the electrolytic solution 17, and the current collection plate 18. The current collection plate 18 is electrically connected to the electrode assembly 10. A part of the electrolytic solution 17 infiltrates the electrode assembly 10, and a part of the electrolytic solution 17 is dissociated free inside the housing 16 or adheres to surfaces of the electrode assembly 10, the housing 16, and the current collection plate 18. The electrochemical device 1 includes a first end 101 and a second end 102 that are opposite to each other. At least two current collection plates 18 are disposed at the first end 101 and the second end 102 respectively. The at least two current collection plates 18 may be connected to a positive electrode and a negative electrode of the electrochemical device 1 respectively.

The electrode assembly 10 includes a first electrode plate 11, a second electrode plate 12, and a separator 13 disposed between the first electrode plate 11 and the second electrode plate 12. The first electrode plate 11, the separator 13, and the second electrode plate 12 are stacked and wound. The first end 101 and the second end 102 are disposed on two opposite sides of the electrode assembly 10 respectively along the direction of the winding central axis X. Referring to FIG. 3A, FIG. 3B, FIG. 4, and FIG. 5, the first electrode plate 11 includes a first current collector 110 and a first active material layer 141 disposed on the first current collector 110. The first current collector 110 includes a first part 111 and a first active material layer region 113. The first part 111 is connected to the first active material layer region 113. In the direction of the winding central axis, the first part 111 is located at an end of the first current collector 110 and is closer to the first end 101 than the second end 102. The first current collector 110 includes a first surface 1101 and a second surface 1102 that are opposite to each other. The first active material layer 141 is coated on the first surface 1101 and the second surface 1102 of the first active material layer region 113. The first part 111 may be an empty foil region. The first surface 1101 and the second surface 1102 of the first part 111 are not coated with the first active material layer 141.

Figure 4:
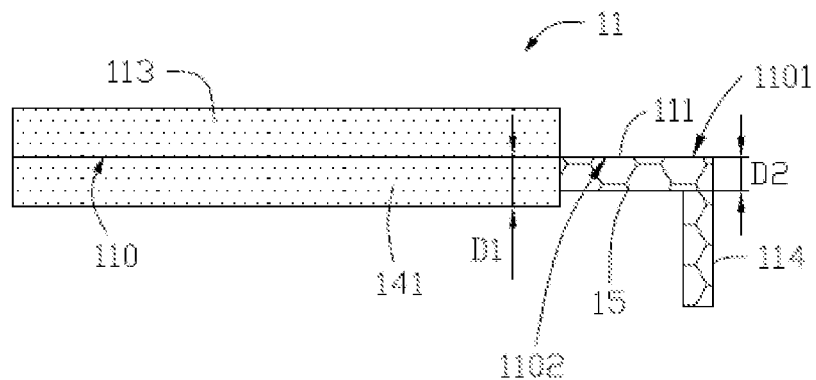
FIG. 4 is a schematic structural diagram of a first electrode plate of an electrochemical device according to an embodiment of this application.

As shown in FIG. 4, in this embodiment, a porous layer 15 is disposed on the first part 111. The porous layer 15 may be configured to transfer the electrolytic solution 17, and the porous layer 15 may be disposed on the second surface 1102. Further, at least one end of the porous layer 15 disposed on the first electrode plate 11 is close to or in direct contact with the first active material layer 141.

The porous layer 15 transfers the electrolytic solution 17 effectively. Under the capillary action of the porous layer 15, free electrolytic solution 17 in the electrochemical device 1 can be easily transferred to the first active material layer 141 through the porous layer 15, thereby increasing the content of the electrolytic solution 17 in an environment close to the first active material layer 141 during electrical cycling, and alleviating the problem of insufficient content of the electrolytic solution 17 in a local region inside the electrochemical device 1.

The thickness of the first active material layer 141, referred to as a first thickness $D_1$, is greater than or equal to the thickness of the porous layer 15, referred to as a second thickness $D_2$, to alleviate the problem of wrinkles generated on the first electrode plate 11 during calendering, or to reduce the risk of damaging the first electrode plate 11 due to an uneven stress. Correspondingly, when the porous layer 15 is disposed on the second electrode plate 12, the thickness of the porous layer 15 is smaller than the thickness of the second active material layer 142.

Figure 3A:
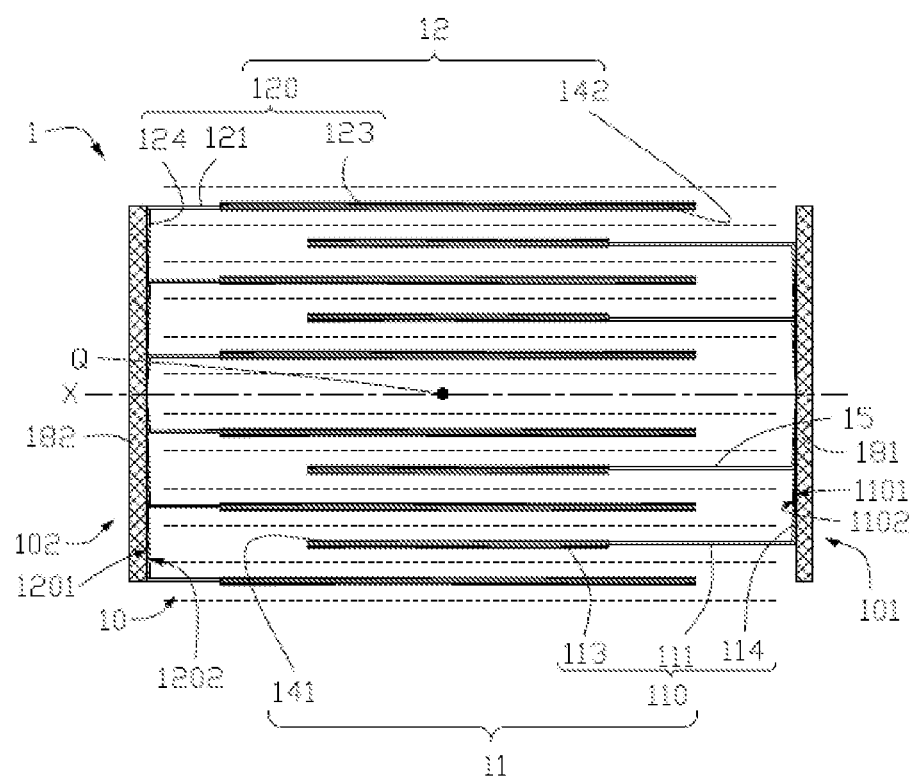
FIG. 3A is a local schematic sectional view of an electrochemical device according to an embodiment of this application.
Figure 3B:
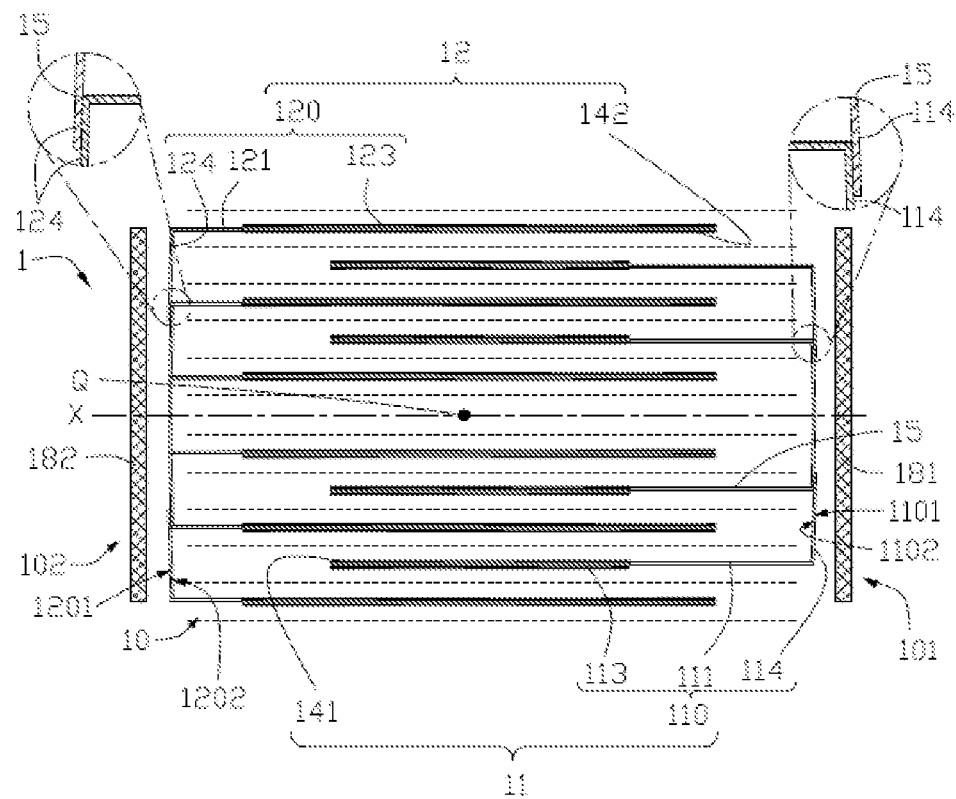
FIG. 3B is an exploded view of FIG. 3A.
Figure 5:
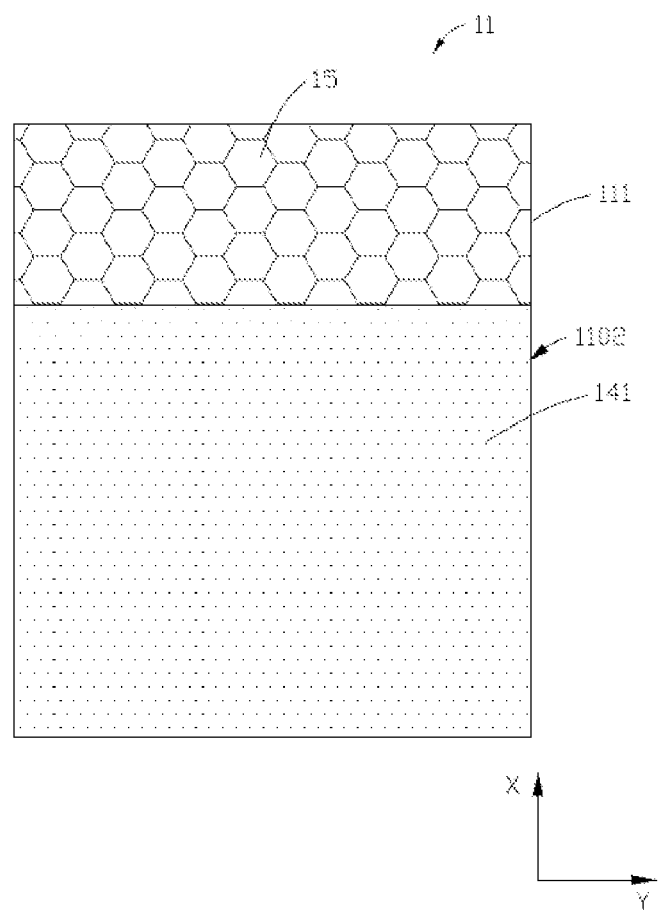
FIG. 5 is a schematic planar view of a first electrode plate of an electrochemical device in an expanded or tiled state according to an embodiment of this application.

Referring to FIG. 3A and FIG. 3B, the second electrode plate 12 includes a second current collector 120 and a second active material layer 142 disposed on the second current collector 120. The second current collector 120 includes a third part 121 and a second active material layer region 123. The third part 121 is connected to the second active material layer region 123. In the direction of the winding central axis, the third part 121 is located at an end of the second current collector 120 and is close to the second end 102. The second current collector 120 includes a third surface 1201 and a fourth surface 1202 that are opposite to each other. The second active material layer 142 is coated on the third surface 1201 and the fourth surface 1202 of the second active material layer region 123. The third part 121 may be an empty foil region. That is, the second active material layer 142 is not coated on the surface of the third part 121. In an embodiment, the second electrode plate 12 in an expanded state may have the same structure as the first electrode plate 11 as shown in FIG. 5. Using the expanded first electrode plate 11 as an example, along the direction of the winding central axis X, the porous layer 15 is disposed on one side of the first active material layer 141. The first direction Y is a length direction of the electrode plate (the first electrode plate 11 or the second electrode plate 12). A plane in which the first direction Y is located may be perpendicular to the direction of the winding center axis X. The porous layer 15 may be further disposed on the third surface 1201.

In an embodiment, the first part 111 includes a first bend part 114 located at the end of the first current collector 110. The first bend portion 114 is close to the first end 101 and bent toward the winding center Q. The third part 121 includes a second bend portion 124 located at the end of the second current collector 120. The second bend portion 124 is close to the second end 102 and bent toward the winding center Q. The winding center Q may be a center point of the winding central axis X inside the electrochemical device 1. For clarity of illustration in the drawing, the first bend portion 114 is at an angle to a direction perpendicular to the winding central axis X, but in practice, may be approximately parallel to the direction, so that the first surface 1101 at the first bend portion 114 and the third surface 1201 at the second bend portion 124 are weldable to the current collection plate 18.

Referring to FIG. 2, the current collection plate 18 includes a first current collection plate 181 and a second current collection plate 182. The first current collection plate 181 is disposed at the first end 101 and electrically connected to the first electrode plate 11. Further, the first current collection plate 181 is electrically connected to the first surface 1101 of the first bend portion 114 facing the first end 101. The second current collection plate 182 is disposed at the second end 102 and electrically connected to the second electrode plate 12. Further, the second current collection plate 182 is connected to the third surface 1201 of the second bend portion 124 facing the second end 102.

The current collection plate 18 is a conductive material, and is configured to electrically connect the electrode assembly 10 to the positive electrode and negative electrode of the electrochemical device 1 located in the housing 16. The first current collection plate 181 is electrically connected, by means such as welding or conductive adhesive bonding, to a part of the first electrode plate 11 facing the first end 101. The second current collection plate 182 is electrically connected, by means such as welding or conductive adhesive bonding, to a part of the second electrode plate 12 facing the second end 102.

In an embodiment, the housing 16 may be a hollow cylindrical structure. The electrode assembly 10, the electrolytic solution 17, and the current collection plate 18 are disposed inside the housing 16. The parts of the housing 16, located at the first end 101 and the second end 102 respectively, may be conductive structures. A conductive bulge 160 is disposed at an end of the housing 16, where the end is located at the first end 101. The conductive bulge 160 is electrically connected to the first current collection plate 181 through a first conductive rod 169. The part of the housing 16, located at the second end 102, is electrically connected to the second current collection plate 182. In an embodiment, the conductive rod 169 is insulated from the housing 16.

In an embodiment, a porous layer 15 is disposed between a surface (a second surface 1102) of the first bend portion 114 located in an outer circle of the electrode assembly 10 facing opposite from the first end 101 and a surface (a first surface 1101) of an adjacent first bend portion 114 located in an inner circle facing the first end 101, to enhance the transfer of the electrolytic solution 17.

The porous layer 15 is disposed on at least one surface of the first bend portion 114 and the second bend portion 124 facing the winding center Q; or, in other words, the porous layer 15 is disposed on the surface of the first bend portion 114 facing opposite from the first end 101, and the porous layer 15 is disposed on the surface of the second bend portion 124 facing opposite from the second end 102. In this embodiment, the porous layer 15 is disposed on the second surface 1102 of the first bend portion 114 facing opposite from the first end 101, and the porous layer 15 is disposed on the fourth surface 1202 of the second bend portion 124 facing opposite from the second end 102.

In an embodiment, the first electrode plate 11 may be a negative electrode plate of the electrochemical device 1, and the second electrode plate 12 may be a positive electrode plate of the electrochemical device 1. In another embodiment, the first electrode plate 11 may be a positive electrode plate of the electrochemical device 1, and the second electrode plate 12 may be a negative electrode plate of the electrochemical device. In an embodiment, in the direction of the winding central axis X, a distance between the first active material layer region 113 and the first end 101 is greater than a distance between the second active material layer region 123 and the second end 102, so as to reduce the risk of lithium plating. The porous layer 15 disposed on the first part 111 between the first active material layer region 113 and the first end 101 can increase the speed of transferring the electrolytic solution 17 from the first end 101 to the first active material layer region 113.

The porous layer 15 includes at least one of a polymer material or a ceramic material. The polymer material includes at least one of polyvinylidene difluoride, polytetrafluoroethylene, polyurethane, polyethylene oxide, polypropylene oxide, polyacrylonitrile, polyacrylamide, polymethyl acrylate, polymethyl methacrylate, polyvinyl acetate, polyvinylpyrrolidone, polytetraethylene glycol diacrylate, polyimide, polyphenylene ester, polyarylether, or polypyrrole. The ceramic material includes at least one of boehmite, silicon dioxide, aluminum oxide, titanium oxide, magnesium oxide, magnesium hydroxide, zirconium oxide, mullite, or cordierite.

Figure 6:
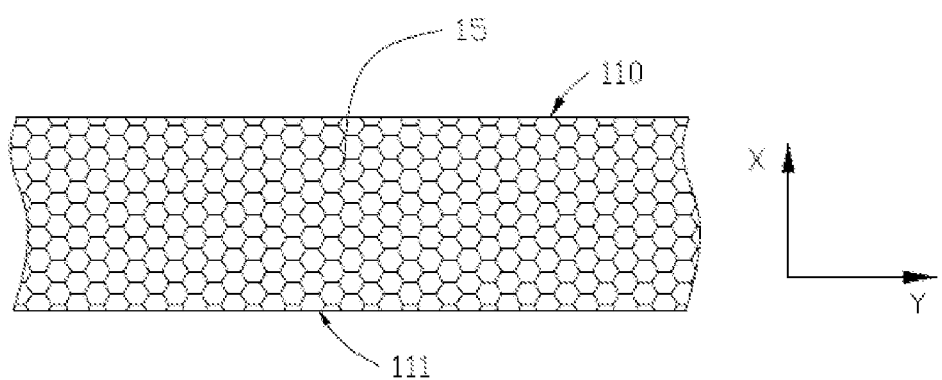
FIG. 6 is a schematic structural diagram of a porous layer of an electrochemical device according to an embodiment of this application.
Figure 7:
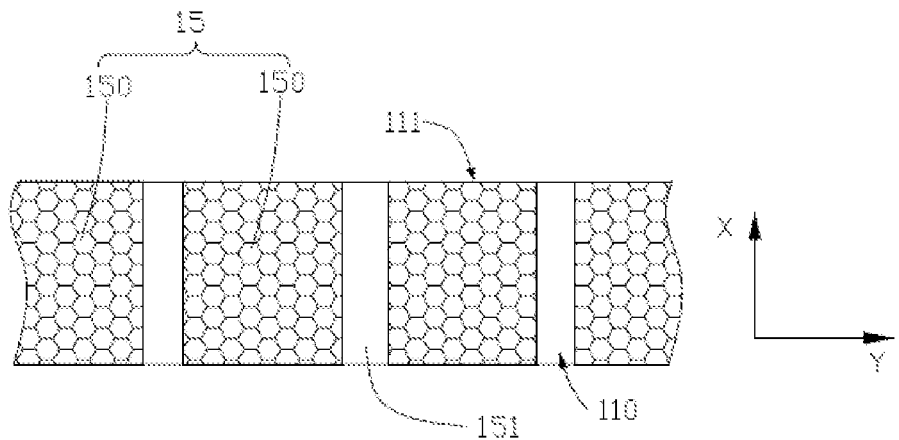
FIG. 7 is a schematic structural diagram of a porous layer of an electrochemical device according to an embodiment of this application.

In one embodiment, as shown in FIG. 6, the porous layer 15 may be disposed on the surface of the first current collector 110 in a continuous manner. In other embodiments, as shown in FIG. 7, the porous layer 15 includes a plurality of interspaced sub-layers 150. The plurality of sub-layers 150 may be spaced out along the first direction Y. Grooves 151 between the plurality of interspaced sub-layers 150 can be configured to accommodate the electrolytic solution 17. The grooves 151 may extend along the direction of the winding central axis X approximately.

Figure 8:
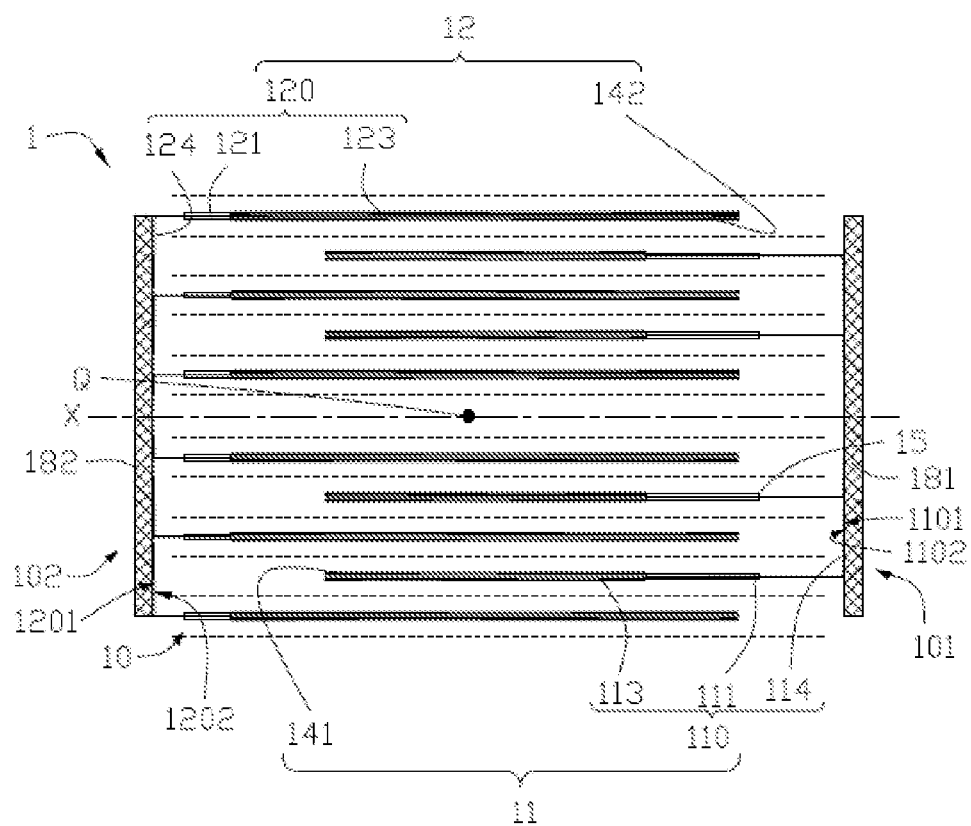
FIG. 8 is a local schematic sectional view of an electrochemical device according to another embodiment of this application.
Figure 9:
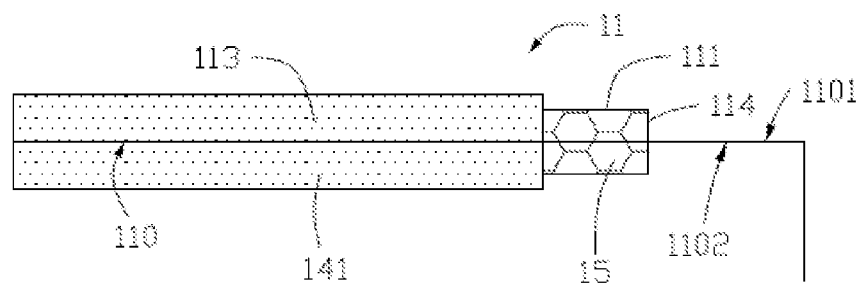
FIG. 9 is a schematic structural diagram of a first electrode plate of an electrochemical device according to another embodiment of this application.

FIG. 8 and FIG. 9 show another embodiment of this application, and differ from the embodiments shown in FIG. 1 to FIG. 7 in the position range in which the porous layer 15 is disposed.

Specifically, using a circumstance as an example in which the porous layer 15 is disposed on the first electrode plate 11. In this embodiment, the porous layer 15 is disposed in the first part 111. The porous layer 15 may be disposed on the opposite first surface 1101 and second surface 1102 of the first current collector 110. The part of the porous layer 15, which is disposed in the first part 111 and does not extend to the first bend portion 114, may be configured to transfer the electrolytic solution 17 from a side close to the current collection plate 18 to a side close to the first active material layer region 113. The arrangement of the porous layer 15 on the second electrode plate 12 is the same as the arrangement on the first electrode plate 11.

Figure 10:
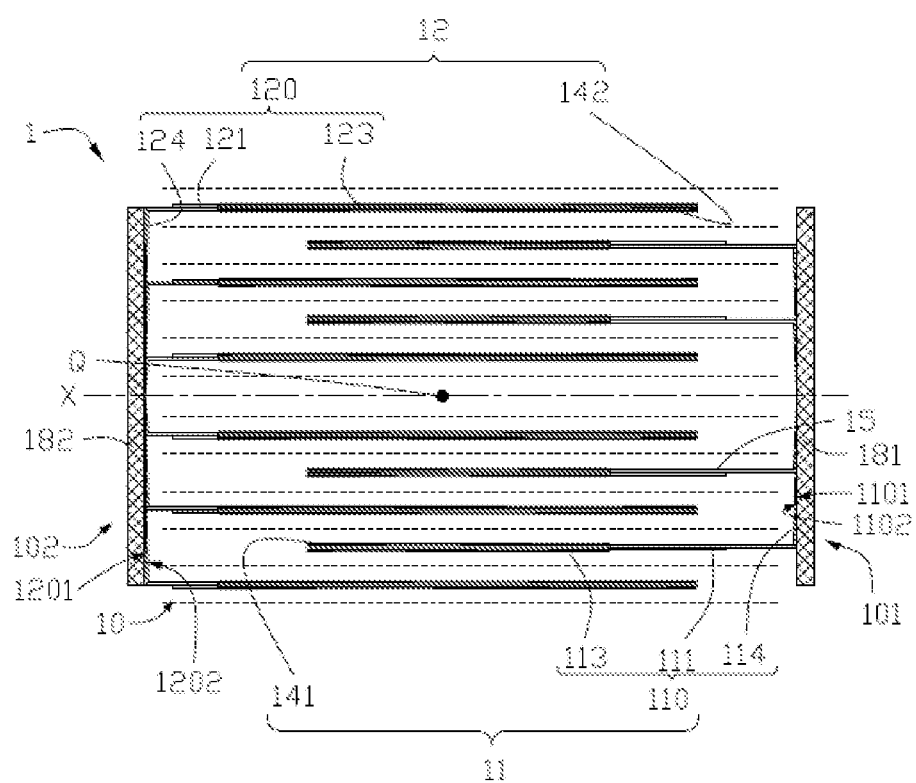
FIG. 10 is a local schematic sectional view of an electrochemical device according to still another embodiment of this application.
Figure 11:
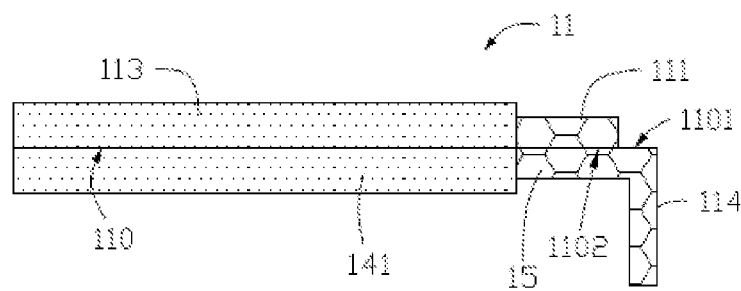
FIG. 11 is a schematic structural diagram of a first electrode plate of an electrochemical device according to still another embodiment of this application.

FIG. 10 and FIG. 11 show another embodiment of this application, and differ from the embodiments shown in FIG. 1 to FIG. 7 in the position range in which the porous layer 15 is disposed.

In an embodiment, using a circumstance as an example in which the porous layer 15 is disposed on the first electrode plate 11. In this embodiment, the porous layer 15 is disposed in the first part 111. The part of the porous layer 15, which is disposed in the first part 111 and does not extend to the first bend portion 114, may be disposed on the opposite first surface 1101 and second surface 1102 of the first current collector 110. The part of the porous layer 15, which is disposed in the first bend portion 114, is merely disposed on the second surface 1102 of the first current collector 110 facing the winding center Q. The porous layer 15 may be configured to transfer the electrolytic solution 17 from the side close to the current collection plate 18 to the side close to the first active material layer region 113. The arrangement of the porous layer 15 on the second electrode plate 12 is the same as the arrangement on the first electrode plate 11.

Figure 12:
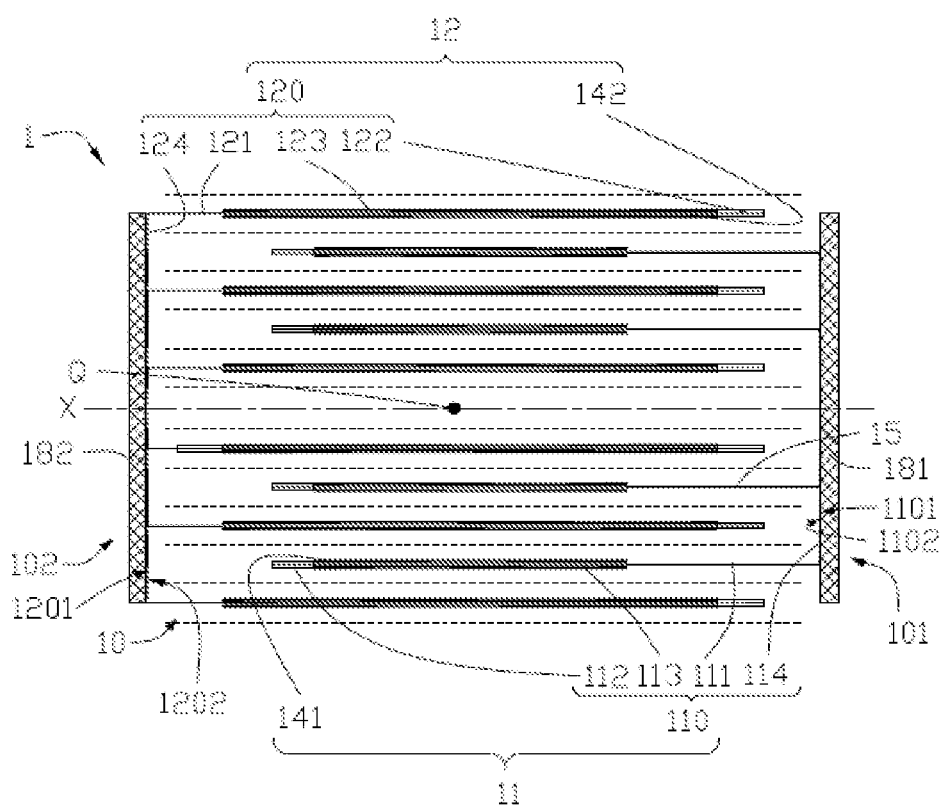
FIG. 12 is a local schematic sectional view of an electrochemical device according to yet another embodiment of this application.
Figure 13:
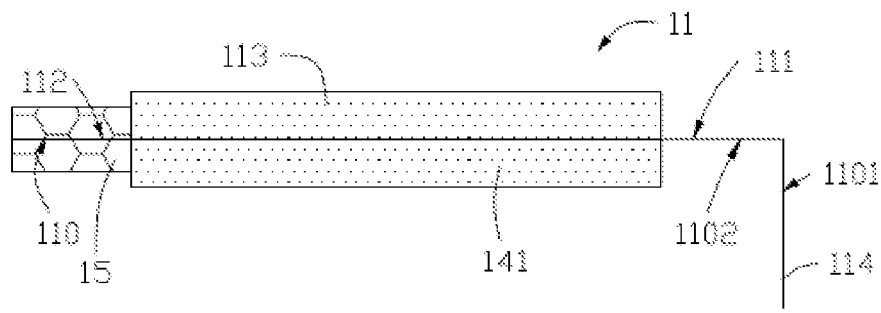
FIG. 13 is a schematic structural diagram of a first electrode plate of an electrochemical device according to yet another embodiment of this application.

FIG. 12 and FIG. 13 show another embodiment of this application, and differ from the embodiments shown in FIG. 1 to FIG. 7 in that the first current collector 110 further includes a second part 112 and that the porous layer 15 is disposed in a different position range.

In an embodiment, using a circumstance as an example in which the porous layer 15 is disposed on the first electrode plate 11. In this embodiment, the second part 112 and the first part 111 are disposed on two ends of the first active material layer region 113 respectively. The second part 112 is connected to the first active material layer region 113. The porous layer 15 is disposed in the second part 112. The porous layer 15 may be disposed on the opposite first surface 1101 and second surface 1102 of the second current collector 120, and may be configured to transfer the electrolytic solution 17 from the side close to the current collection plate 18 to the side close to the first active material layer region 113. The arrangement of the porous layer 15 on the second electrode plate 12 is the same as the arrangement on the first electrode plate 11.

Figure 14:
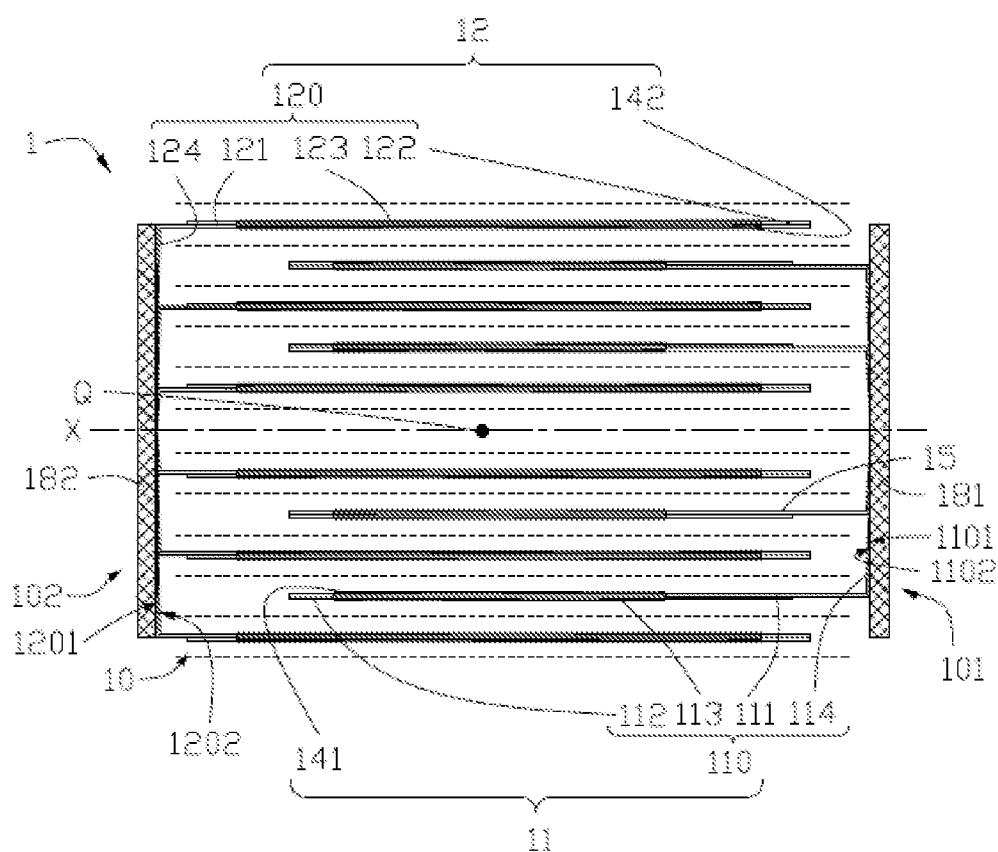
FIG. 14 is a local schematic sectional view of an electrochemical device according to yet another embodiment of this application.
Figure 15:
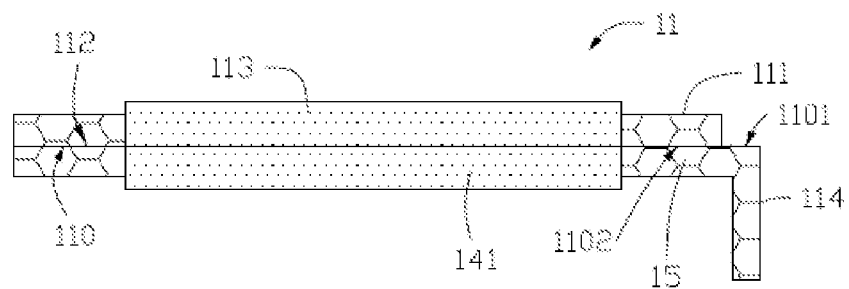
FIG. 15 is a schematic structural diagram of a first electrode plate of an electrochemical device according to yet another embodiment of this application.

FIG. 14 and FIG. 15 show another embodiment of this application, and differ from the embodiments shown in FIG. 1 to FIG. 7 in that the first current collector 110 further includes a second part 112 and that the porous layer 15 is disposed in a different position range.

In an embodiment, using a circumstance as an example in which the porous layer 15 is disposed on the first electrode plate 11. In this embodiment, the second part 112 and the first part 111 are disposed on the two ends of the first active material layer region 113 respectively. The second part 112 is connected to the first active material layer region 113. The porous layer 15 is disposed in the first part 111 and the second part 112. The part of the porous layer 15, which is disposed in the first part 111 and that does not extend to the first bend portion 114, may be disposed on the opposite first surface 1101 and second surface 1102 of the first current collector 110. The part of the porous layer 15, which is disposed in the first bend portion 114, is merely disposed on the second surface 1102 of the first current collector 110 facing the winding center Q. The part of the porous layer 15, which is disposed in the second part 112, may be disposed on the opposite first surface 1101 and second surface 1102 of the first current collector 110. The porous layer 15 may be configured to transfer the electrolytic solution 17 from the side close to the current collection plate 18 to the side close to the first active material layer region 113. The arrangement of the porous layer 15 on the second electrode plate 12 is the same as the arrangement on the first electrode plate 11.

Figure 16:
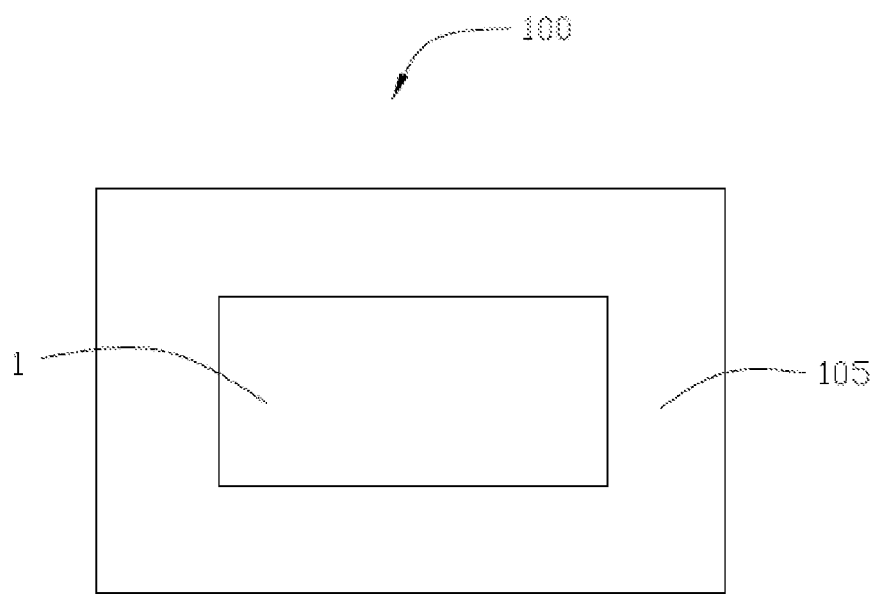
FIG. 16 is a schematic diagram of an electronic device according to an embodiment of this application.

As shown in FIG. 16, an embodiment of this application further provides an electronic device 100. The electronic device 100 includes an electrochemical device 1 and a load 105. The electrochemical device 1 is configured to supply power to the load 105. The electronic device 100 according to this application is not particularly limited, and may be any electronic device known in the prior art.

In some embodiments, the electronic device 100 may include, but is not limited to, a notebook computer, a pen-inputting computer, a mobile computer, an e-book player, a portable communications device, a portable photocopier, a portable printer, a backup power supply, a motor, an automobile, a motorcycle, an electric bicycle, a lighting device, a toy, an electric tool, a large household storage battery, a lithium-ion capacitor, or the like.

What is described above with reference to drawings is specific embodiments of this application. Although the embodiments of this application are described above, a person of ordinary skill in the art understands that various modifications and replacements may be made to the specific embodiments of this application without departing from the scope of this application. Such modifications and replacements fall within the scope of this application claimed by the claims hereof

What is claimed is:

1. An electrochemical device, comprising:
   an electrolytic solution;
   an electrode assembly comprising a first electrode plate, a second electrode plate, and a separator disposed between the first electrode plate and the second electrode plate; wherein the first electrode plate, the separator, and the second electrode plate are stacked and wound; and in a direction of a winding central axis, the electrode assembly comprises a first end and a second end that are opposite to each other;
   the first electrode plate comprises a first current collector; the first current collector comprises a first active material region, and a first part connected to the first active material region along the direction of the winding central axis; in the direction of the winding central axis, the first part is located at an end of the first current collector and is closer to the first end than the second end; wherein, a porous layer is directly disposed on the first current collector in the first part, wherein the first part comprises a first bend located at the end of the first current collector, and the first bend is disposed at an angle substantially perpendicular to the winding central axis; a first active material layer is disposed on the first current collector in the first active material region;
   a first current collection plate disposed at the first end, and a second current collection plate disposed at the second end; and
   a housing configured to accommodate the electrolytic solution and the electrode assembly.

2. The electrochemical device according to claim 1, wherein the porous layer comprises at least one of a polymer material or a ceramic material.

3. The electrochemical device according to claim 2, wherein the polymer material comprises at least one of polyvinylidene difluoride, polytetrafluoroethylene, polyurethane, polyethylene oxide, polypropylene oxide, polyacrylonitrile, polyacrylamide, polymethyl acrylate, polymethyl methacrylate, polyvinyl acetate, polyvinylpyrrolidone, polytetraethylene glycol diacrylate, polyimide, polyphenylene ester, polyarylether, or polypyrrole.

4. The electrochemical device according to claim 1, wherein the first bend portion located on an outer circle of the electrode assembly is connected to a surface of an adjacent first bend portion located in an inner circle of the electrode assembly, wherein the surface faces the first end.

5. The electrochemical device according to claim 1, wherein the porous layer is disposed on a surface of the first bend portion facing opposite from the first end, and a surface of the first bend portion facing the first end is connected to the first current collection plate.

6. The electrochemical device according to claim 1, wherein the first current collector further comprises a third part, and in the direction of the winding central axis, the third part is located at an end of the first current collector and is closer to the second end than the first end, and the porous layer is disposed on the third part.

7. The electrochemical device according to claim 1, wherein in the direction of the winding central axis, the porous layer comprises a plurality of interspaced sub-layers.

8. The electrochemical device according to claim 1, wherein a thickness of the porous layer is smaller than a thickness of the active material layer.

9. The electrochemical device according to claim 2, wherein the ceramic material comprises at least one of boehmite, silicon dioxide, aluminum oxide, titanium oxide, magnesium oxide, magnesium hydroxide, zirconium oxide, mullite, or cordierite.

10. The electronic device according to claim 1, wherein the first current collector further comprises a third part, and, in the direction of the winding central axis, the third part is located at an end of the first current collector and is closer to the second end than the first end, and the porous layer is disposed on the third part.

11. The electronic device according to claim 1, wherein in the direction of the winding central axis, the porous layer comprises a plurality of interspaced sub-layers.

12. The electronic device according to claim 1, wherein a thickness of the porous layer is smaller than a thickness of the active material layer.

13. An electronic device, comprising an electrochemical device, wherein the electrochemical device comprises:
   an electrolytic solution;
   an electrode assembly comprising a first electrode plate, a second electrode plate, and a separator disposed between the first electrode plate and the second electrode plate; wherein the first electrode plate, the separator, and the second electrode plate are stacked and wound; and in a direction of a winding central axis, the electrode assembly comprises a first end and a second end that are opposite to each other;

the first electrode plate comprises a first current collector; the first current collector comprises a first active material region, and a first part connected to the first active material region along the direction of the winding central axis; in the direction of the winding central axis, the first part is located at an end of the first current collector and is closer to the first end than the second end; wherein, a porous layer is directly disposed on the first current collector in the first part, wherein the first part comprises a first bend located at the end of the first current collector, and the first bend is disposed at an angle substantially perpendicular to the winding central axis; a first active material layer is disposed on the first current collector in the first active material region;

a first current collection plate disposed at the first end, and a second current collection plate disposed at the second end; and a housing configured to accommodate the electrolytic solution and the electrode assembly.

14. The electronic device according to claim 13, wherein the porous layer comprises at least one of a polymer material or a ceramic material.

15. The electronic device according to claim 14, wherein the polymer material comprises at least one of polyvinylidene difluoride, polytetrafluoroethylene, polyurethane, polyethylene oxide, polypropylene oxide, polyacrylonitrile, polyacrylamide, polymethyl acrylate, polymethyl methacrylate, polyvinyl acetate, polyvinylpyrrolidone, polytetraethylene glycol diacrylate, polyimide, polyphenylene ester, polyarylether, or polypyrrole.

16. The electronic device according to claim 13, wherein the first bend portion located on an outer circle of the electrode assembly is connected to a surface of an adjacent first bend portion located in an inner circle of the electrode assembly, wherein the surface faces the first end.

17. The electronic device according to claim 13, wherein the porous layer is disposed on a surface of the first bend portion facing opposite from the first end, and a surface of the first bend portion facing the first end is connected to the first current collection plate.

18. The electrochemical device according to claim 14, wherein the ceramic material comprises at least one of boehmite, silicon dioxide, aluminum oxide, titanium oxide, magnesium oxide, magnesium hydroxide, zirconium oxide, mullite, or cordierite.

* * * * *